United States Patent
Yoneyama

(10) Patent No.: US 6,785,058 B2
(45) Date of Patent: Aug. 31, 2004

(54) ZOOM LENS SYSTEM

(75) Inventor: Shuji Yoneyama, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/262,875

(22) Filed: Oct. 3, 2002

(65) Prior Publication Data

US 2003/0076601 A1 Apr. 24, 2003

(30) Foreign Application Priority Data

Oct. 5, 2001 (JP) .................................... 2001-309656

(51) Int. Cl.$^7$ ............................................ G02B 15/14
(52) U.S. Cl. ............................................. 359/692
(58) Field of Search ................................ 359/692, 687, 359/688, 690

(56) References Cited

U.S. PATENT DOCUMENTS

| | | | |
|---|---|---|---|
| 5,434,711 A | 7/1995 | Tetsuya et al. | |
| 5,751,498 A | 5/1998 | Ito | |
| 5,900,990 A | 5/1999 | Konno et al. | |
| 5,973,849 A | 10/1999 | Hashimura | |
| 5,986,821 A | * 11/1999 | Yoon | ......................... 359/692 |
| 6,067,196 A | 5/2000 | Yamamoto et al. | |
| 6,154,323 A | 11/2000 | Kamo | |
| 6,215,600 B1 | * 4/2001 | Nishimura et al. | ......... 359/689 |
| 6,236,515 B1 | 5/2001 | Yamamoto et al. | |
| 6,236,518 B1 | 5/2001 | Enomoto | |
| 6,268,966 B1 | 7/2001 | Ishii et al. | |

FOREIGN PATENT DOCUMENTS

| | | |
|---|---|---|
| JP | 5-11181 | 1/1993 |
| JP | 11-84236 | 3/1999 |

* cited by examiner

Primary Examiner—Scott J. Sugarman
Assistant Examiner—Deborah Raizen
(74) Attorney, Agent, or Firm—Greenblum & Bernstein, P.L.C.

(57) ABSTRACT

A zoom lens system includes a positive first lens group and a negative second lens group which move in an optical axis direction upon zooming. The positive first lens group includes a positive first lens element having a convex surface on the object side, a negative second lens element, and a positive third lens element. The negative second lens group includes a positive meniscus lens fourth lens element having the concave surface facing toward the object, and a negative meniscus fifth lens element having the concave surface facing toward the object. The following conditions (1), (2) and (3) are satisfied:

$$1.2 < ft/f1 < 1.8 \tag{1};$$

$$3.8 < ft/f1G < 4.2 \tag{2); and}$$

$1 \leq SF1 < 6$; wherein ft designates the entire focal length at the long focal length extremity; f1 designates the focal length of the positive first lens element; f1G designates the focal length of the positive first lens group, and SF1 designates the shape factor of the positive first lens element.

5 Claims, 6 Drawing Sheets

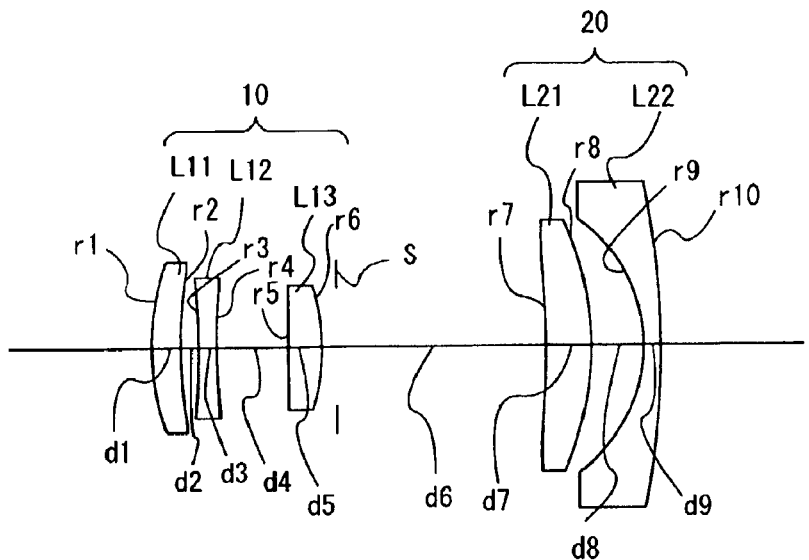
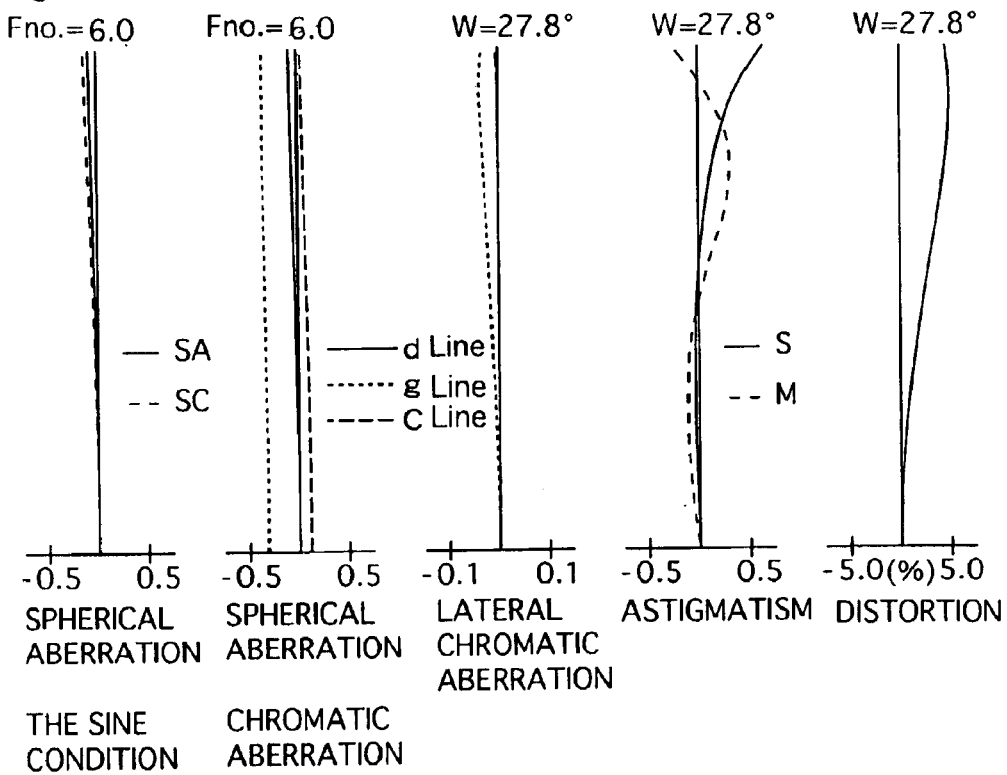

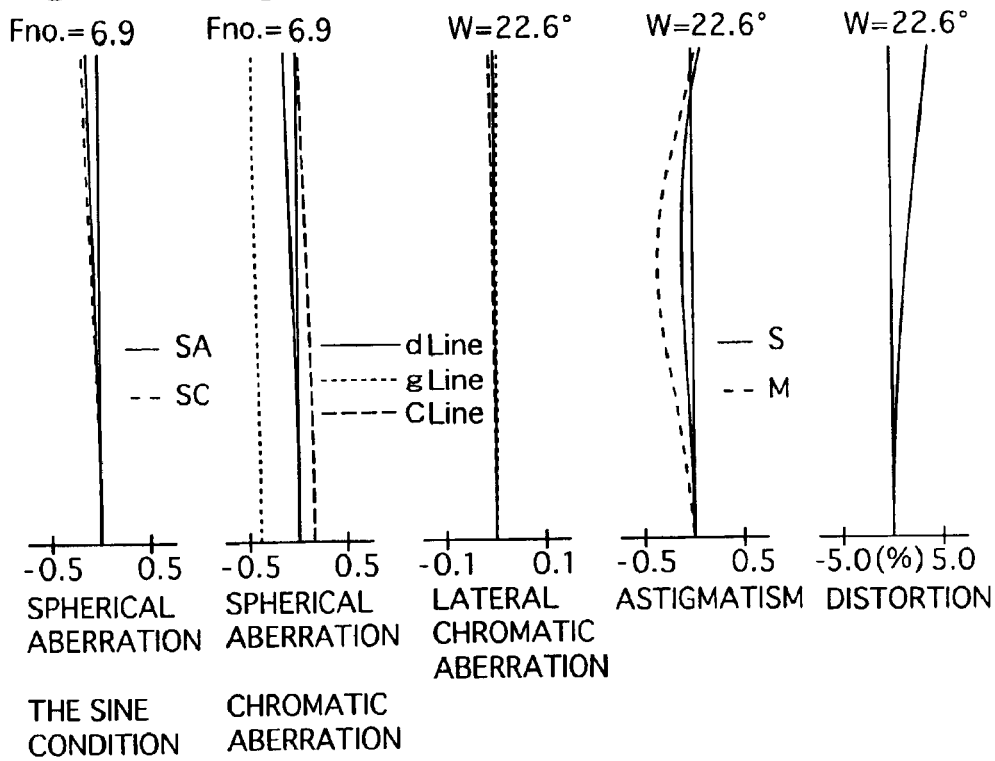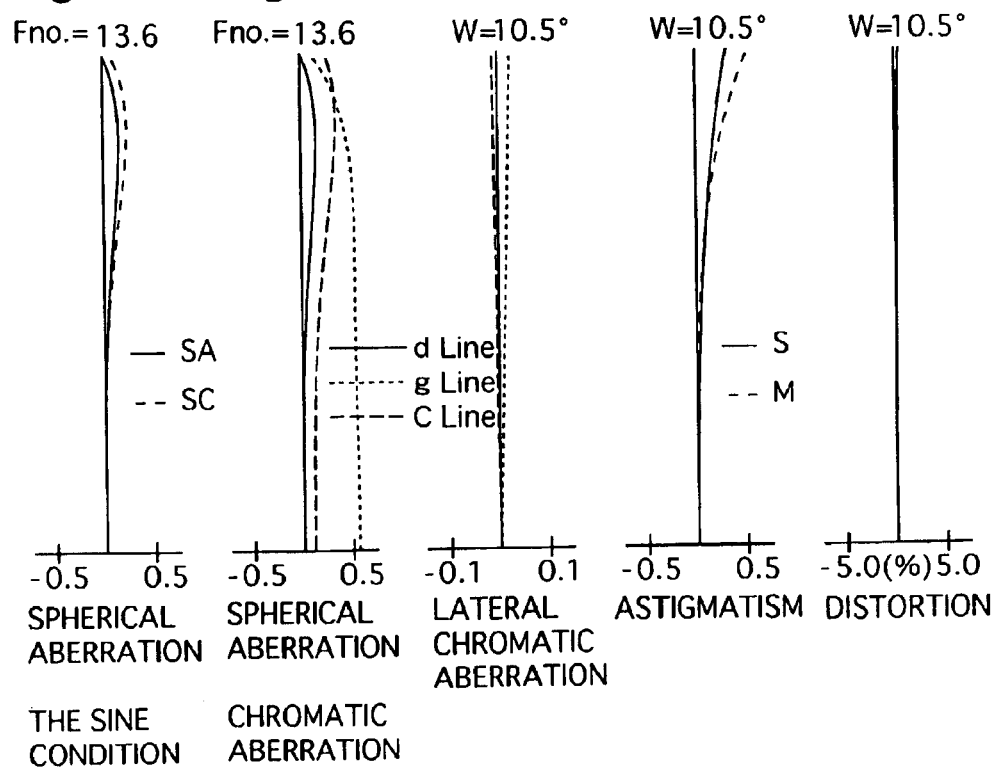

Fig. 5
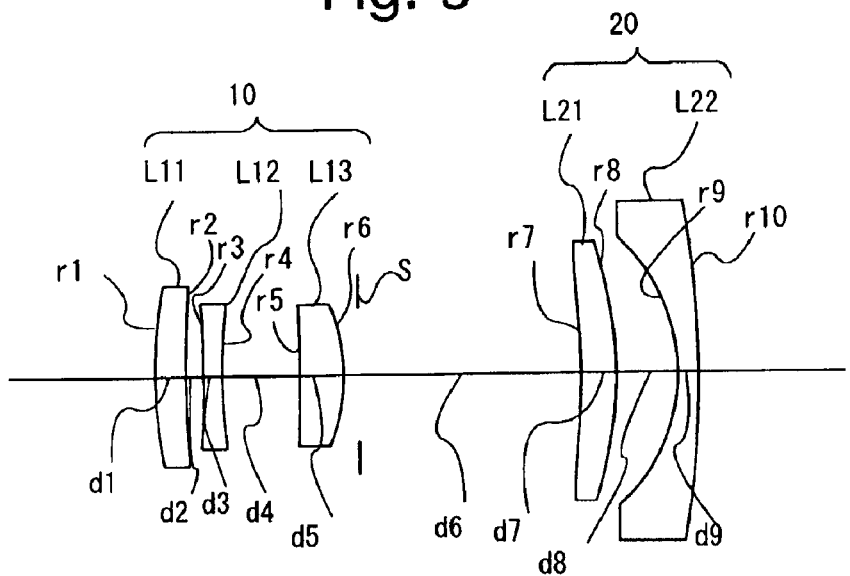
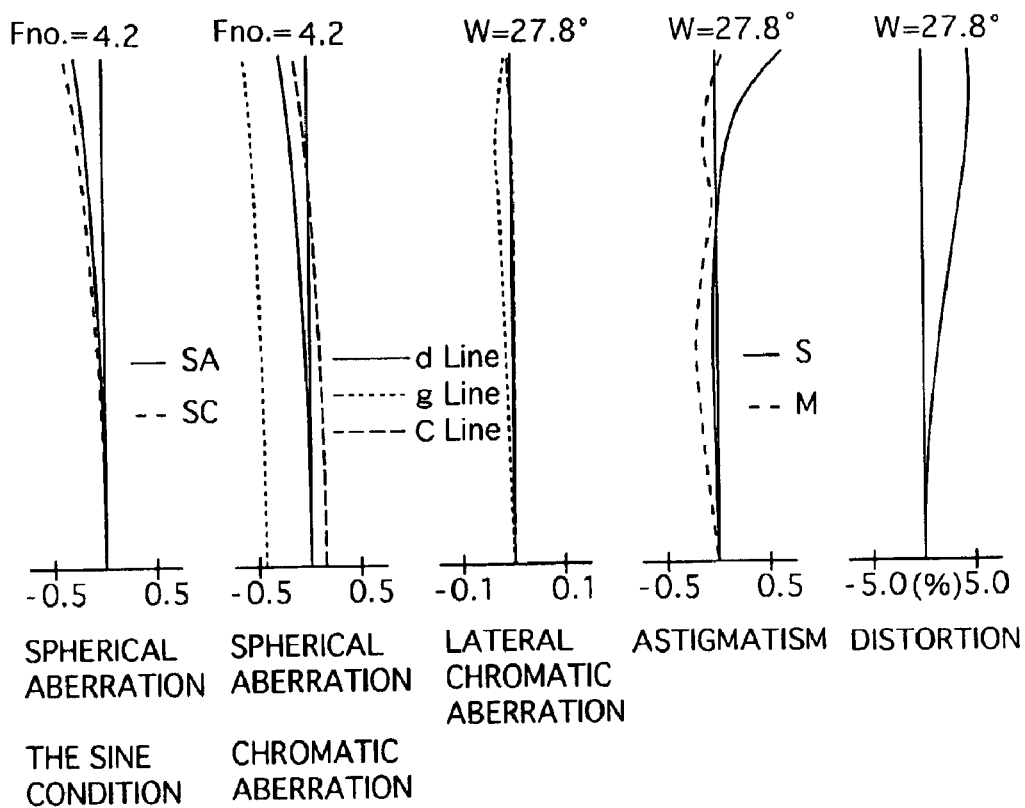
Fig.6A  Fig.6B  Fig.6C  Fig.6D  Fig.6E

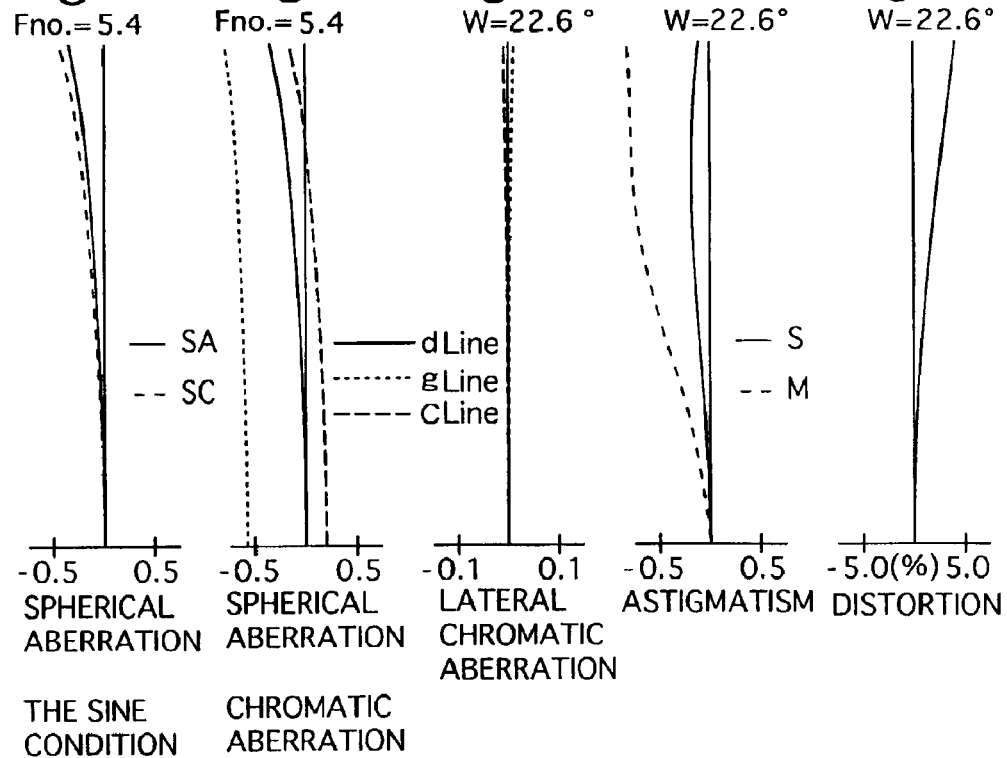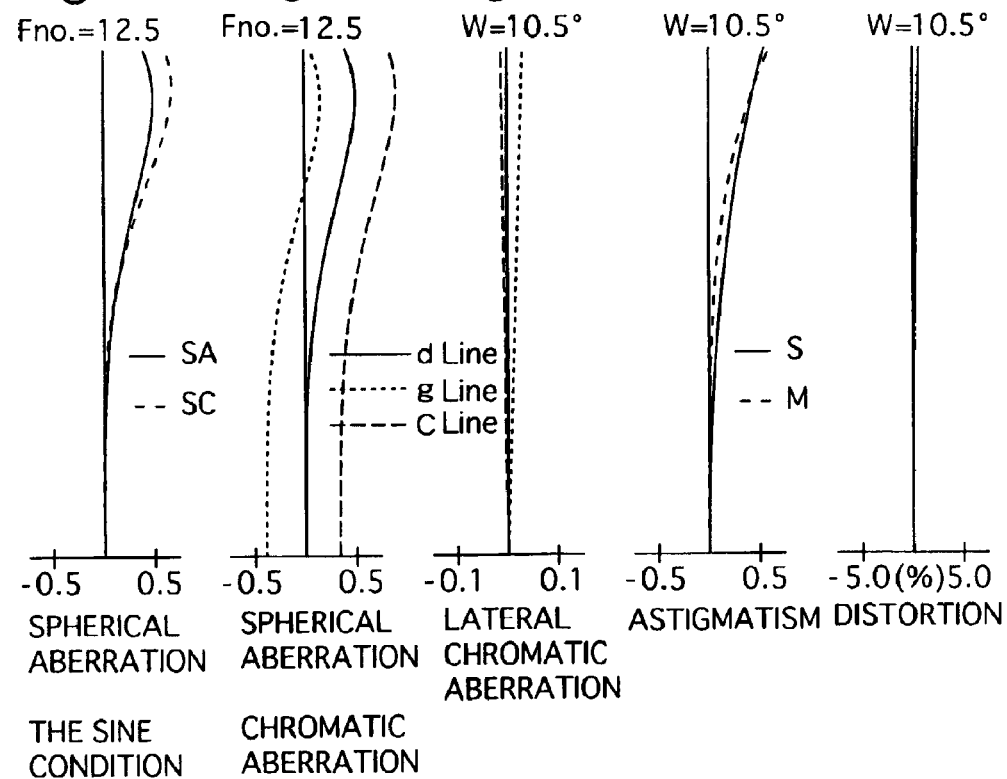

SPHERICAL ABERRATION

THE SINE CONDITION

SPHERICAL ABERRATION

CHROMATIC ABERRATION

LATERAL CHROMATIC ABERRATION

ASTIGMATISM

DISTORTION

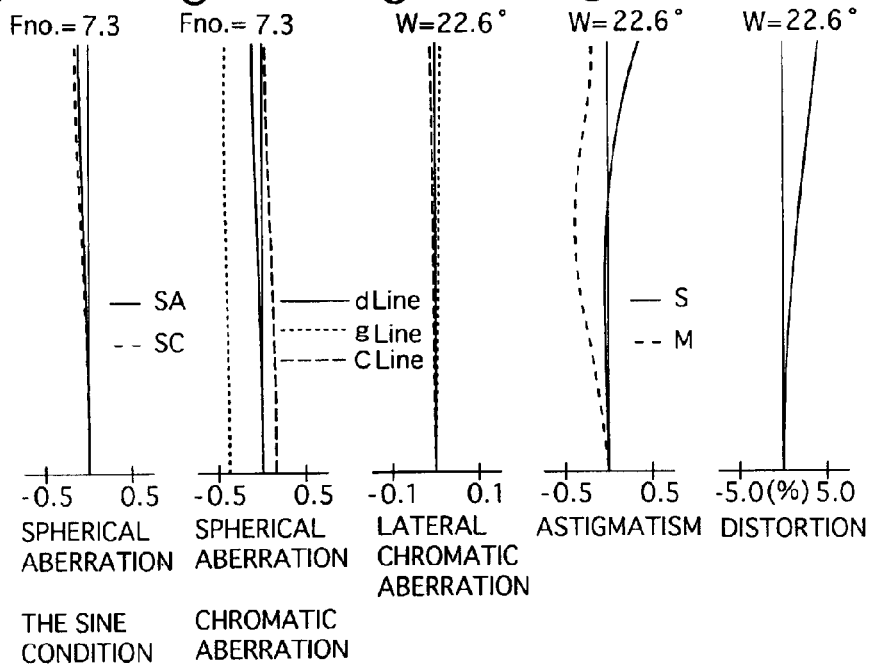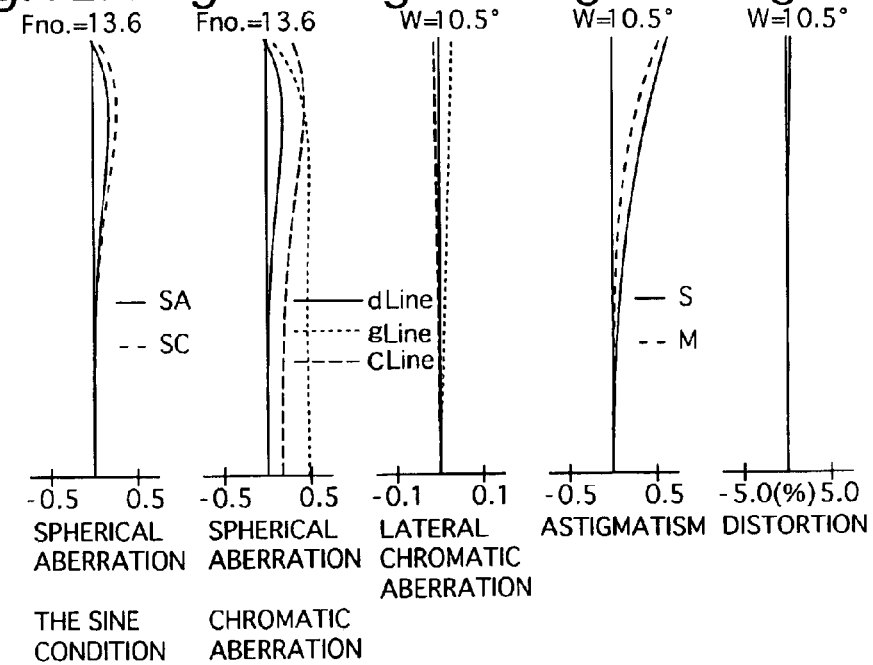

ZOOM LENS SYSTEM

BACKGROUND OF THE INVENTION

1. Field of the Invention

The present invention relates to a zoom lens system which is suitable for a lens-shutter camera and the like.

2. Description of the Prior Art

Various zoom lens systems for lens-shutter cameras have been proposed. For example, in a zoom lens system of the prior art as disclosed in Japanese Unexamined Patent Publication No. Hei-5-11181, the lens arrangement is simple; however, the zoom ratio is low. Furthermore, in the case where the number of lens elements is small, as disclosed in U.S. Pat. Nos. 5,434,711; 5,973,849, 6,236,515 and 6,067,196, a three-lens-group zoom lens system is employed, so that the zooming mechanism thereof becomes complicated, and low production cost thereof cannot be achieved. In the case of a large zoom ratio as disclosed in Japanese Unexamined Patent Publication No.Hei-11-84236, the amount of change in the overall length thereof upon zooming is too large, so that it is difficult to constitute the lens barrels therefor. Moreover, in a lens system disclosed in U.S. Pat. No. 6,154,323, the number of lens is small; however, expensive diffraction optical elements are employed therein, so that the production thereof is difficult, and higher-order diffracted light could become flare.

SUMMARY OF THE INVENTION

The present invention provides a low-cost zoom lens system having a smaller number of lens elements and the zoom ratio of approximately 3.1.

As an aspect of the present invention, there is provided a zoom lens system including a positive first lens group and a negative second lens group, in this order from the object. Zooming is performed by moving each of the positive first and negative second lens groups in an optical axis direction.

The positive first lens group includes a positive first lens element having a convex surface facing toward the object, a negative second lens element, and a positive third lens element, in this order from the object.

The negative second lens group includes a fourth lens element which is formed as a positive meniscus lens element having the concave surface facing toward the object, and a fifth lens element which is formed as a negative meniscus lens element having the concave surface facing toward the object, in this order from the object.

The zoom lens system satisfies following conditions:

$$1.2 < ft/f1 < 1.8 \quad (1)$$

$$3.8 < ft/f1G < 4.2 \quad (2)$$

$$1 \leq SF1 < 6 \quad (3)$$

wherein ft designates the focal length of the entire zoom lens system at the long focal length extremity;

f1 designates the focal length of the positive first lens element;

f1G designates the focal length of the positive first lens group, and

SF1 designates the shape factor of the positive first lens element, defined as $SF1=(r2+r1)/(r2-r1)$, r1 designates the radius of curvature of the first surface of the positive first lens element; and r2 designates the radius of curvature of the second surface of the positive first lens element.

The zoom lens system preferably satisfies the following conditions:

$$1.50 < n1p < 1.68 \quad (4)$$

$$-81.2 \times n1p + 172.7 < v1p < -250 \times n1p + 468 \quad (5)$$

wherein n1p designates the refractive index of the positive lens elements in the positive first lens group; and v1p designates the Abbe number of the positive lens elements in the positive first lens group.

The zoom lens system can satisfy the following condition:

$$0.45 < \Delta X/ft < 0.50 \quad (6)$$

wherein

ΔX designates the traveling distance of the positive first lens group upon zooming from the short focal length extremity to the long focal length extremity.

Furthermore, the zoom lens system satisfies the following condition:

$$-3.0 < \Delta ASP2 \times 1000/fs < -1.0 \quad (7)$$

wherein

ΔASP2 designates the amount of asphericity on the object-side surface of the negative second lens element.

fs designates the focal length of the entire zoom lens at the short focal length extremity.

The present disclosure relates to subject matter contained in Japanese Patent Application No.2001-309656 (filed on Oct. 5, 2001) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of a zoom lens system according to a first embodiment of the present invention;

FIGS. 2A, 2B, 2C, 2D and 2E show aberrations occurred in the lens arrangement shown in FIG. 1 at the short focal length extremity;

FIGS. 3A, 3B, 3C, 3D and 3E show aberrations occurred in the lens arrangement shown in FIG. 1 at an intermediate focal length;

FIGS. 4A, 4B, 4C, 4D and 4E show aberrations occurred in the lens arrangement shown in FIG. 1 at the long focal length extremity;

FIG. 5 is a lens arrangement of a zoom lens system according to a second embodiment of the present invention;

FIGS. 6A, 6B, 6C, 6D and 6E show aberrations occurred in the lens arrangement shown in FIG. 5 at the short focal length extremity;

FIGS. 7A, 7B, 7C, 7D and 7E show aberrations occurred in the lens arrangement shown in FIG. 5 at an intermediate focal length;

FIGS. 8A, 8B, 8C, 8D and 8E show aberrations occurred in the lens arrangement shown in FIG. 5 at the long focal length extremity;

FIGS. 11A, 11B, 11C, 11D and 11E show aberrations occurred in the lens arrangement shown in FIG. 9 at an intermediate focal length; and FIGS. 12A, 12B, 12C, 12D and 12E show aberrations occurred in the lens arrangement shown in FIG. 9 at the long focal length extremity.

DESCRIPTION OF THE PREFERRED EMBODIMENTS

Figure 9:
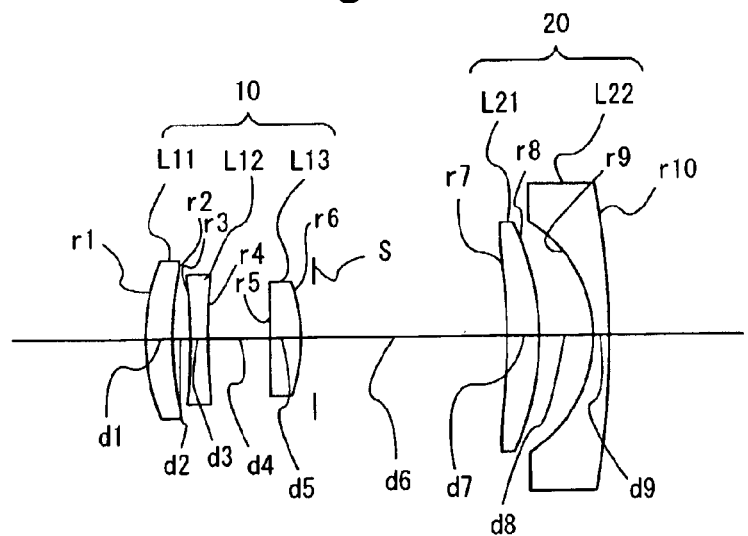
FIG. 9 is a lens arrangement of a zoom lens system according to a third embodiment of the present invention.
Figures 10A, 10B, 10C, 10D, 10E:
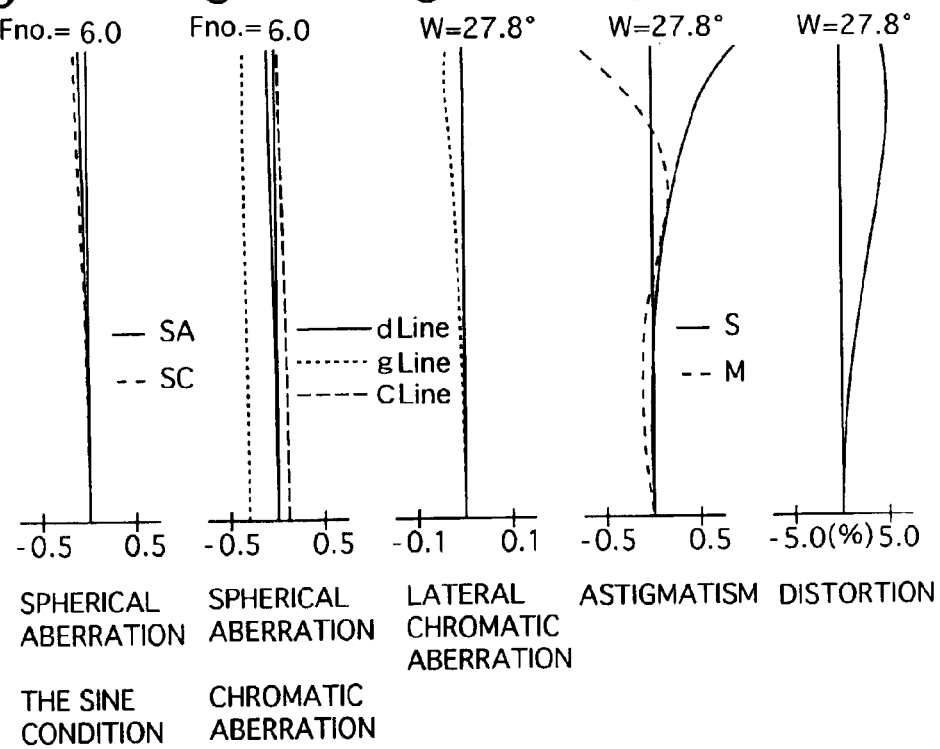
FIGS. 10A, 10B, 10C, 10D and 10E show aberrations occurred in the lens arrangement shown in FIG. 9 at the short focal length extremity.

FIG. 1 is a lens arrangement of a zoom lens system according to the first embodiment of the present invention.

The zoom lens system according to the first embodiment is a two-lens-group zoom lens system including a positive first lens group 10 and a negative second lens group 20, in this order from the object. Zooming is performed by moving each of the positive first lens group 10 and the negative second lens group 20 in the optical axis direction.

The positive first lens group 10 includes a positive first lens element L1 having a convex surface facing toward the object, a negative second lens element L2, and a positive third lens element L3, in this order from the object.

The negative second lens group 20 includes a fourth lens element L4 which is formed as a positive meniscus lens element having the concave surface facing toward the object, and a fifth lens element L5 which is formed as a negative meniscus lens element having the concave surface facing toward the object, in this order from the object.

A diaphragm S is provided between the positive first lens group 10 and the negative second lens group 20. In such a two-lens-group zoom lens system, the negative second lens group 20 elongates the focal length of the positive first lens group 10. Accordingly, the positive first lens group 10 has a strong positive optical power (hereinafter, power) and a smaller f-number with respect to the entire zoom lens system. Likewise, the aberrations occurred in the positive first lens group 10 are made larger by the negative second lens group 20. It is therefore necessary to sufficiently correct these aberrations in advance in the positive first lens group 10.

If an attempt is made to obtain such a zoom lens system as explained above with a smaller number of lens elements in consideration of production costs, a triplet optical system including a positive lens element, a negative lens element and a positive lens element, is suitable for this purpose, since a triplet optical system can attain an aplanatic optical system. Accordingly, the positive first lens group 10 employs a positive-negative-positive triplet lens arrangement.

The positive first lens element L1 satisfies condition (1).

Condition (1) specifies the power of the positive first lens element L1.

If the power of the positive first lens element L1 becomes weaker to the extent that ft/f1 exceeds the lower limit of condition (1), the overall length of the zoom lens system becomes longer.

If the power of the positive first lens element L1 becomes stronger to the extent that ft/f1 exceeds the upper limit of condition (1), aberrations, such as particularly spherical aberration and coma, which occur in the positive first lens element L1 become larger. Consequently, the negative second lens element L2 cannot correct those aberrations.

Condition (2) specifies the magnification of the negative second lens group 20 at the long focal length extremity.

If the magnification of the negative second lens group 20 becomes smaller to the extent that ft/f1G exceeds the lower limit of condition (2), the zoom ratio of more than 3.0 cannot be attained, while the power of the positive first lens group 10 is suitably maintained.

If the magnification of the negative second lens group 20 becomes larger to the extent that ft/f1G exceeds the upper limit of condition (2), aberrations, such as particularly spherical aberration and coma, which occur in the positive first lens element L1, become larger. Consequently, the positive first lens group 10 cannot be constituted by a smaller number of lens elements, and aberrations occurred in the entire zoom lens system cannot be maintained within an acceptable range.

Condition (3) specifies the shape factor defining the configuration of the positive first lens element L1. This condition is to indicate that the positive first lens element L1 is a planoconvex lens element having the convex surface facing toward the object, or is a meniscus lens element.

If SF1 exceeds the lower limit of condition (3), the positive first lens element L1 has to be formed as a biconvex lens element, and the angle of the off-axis incident light rays becomes sharp. Coma and astigmatism occur, as a result.

If SF1 exceeds the upper limit of condition (3), spherical aberration occurs excessively, and aberrations occurred in the positive first lens group 10 cannot be maintained smaller.

Conditions (4) and (5) are for selecting a low-cost lens material.

If the refractive index of the positive lens elements of the positive first lens group 10 becomes smaller to the extent that n1p exceeds the lower limit of condition (4), such a small refractive index cannot be obtained from ordinary glass or resin. Accordingly, a special material is required, which causes a cost increase.

If the refractive index of the positive lens elements of the positive first lens group 10 becomes larger to the extent that n1p exceeds the upper limit of condition (4), lead or titanium needs to be added into a glass material in order to increase the refractive index thereof; and further, a lanthanum material needs to be added into the glass material in order to increase the Abbe number. Adding such materials causes a cost increase.

If v1p exceeds the lower limit of condition (5), chromatic aberration becomes larger.

If v1p exceeds the upper limit of condition (5), a special-low-dispersion glass in which a special ingredient is used has to be employed as the lens material, which causes a cost increase.

Note that borosilicate glass and dense crown glass are included in the materials which satisfy conditions (4) and (5).

Condition (6) specifies the amount of change in the traveling distance of the positive first lens group 10 from the short focal length extremity to the long focal length extremity.

If the traveling distance of the positive first lens group 10 becomes longer to the extent that $\Delta X/ft$ exceeds upper limit of condition (6), constituting the lens barrel becomes difficult.

If the traveling distance of the positive first lens group 10 becomes shorter to the extent that $\Delta X/ft$ exceeds lower limit of condition (6), the absolute value of the power of each lens group has to be made stronger in order to attain a higher zoom ratio with a shorter traveling distance. Consequently, aberrations largely occur.

Condition (7) specifies the amount of asphericity of the negative second lens element L2. By employing an aspherical surface, it is possible to adequately reduce aberrations with a smaller number of lens elements. The aspherical surface is formed on the object-side surface of the negative second lens element L2, and is formed so that the power becomes negative as the incident height of a light ray increases.

If $\Delta ASP2 \times 1000/fs$ exceeds the upper limit of condition (7), the effect of the negative power becomes smaller, so that spherical aberration cannot be corrected toward the positive direction.

If the amount of asphericity becomes smaller to the extent that $\Delta ASP2 \times 1000/fs$ exceeds the lower limit of condition (7), spherical aberration is overcorrected, so that aberrations cannot be adequately maintained over the entire zoom lens system.

Specific numerical data of the embodiments will be described hereinafter. In the diagrams of chromatic aberration and the sine condition, SA designates spherical aberration, and SC designates the sine condition. In the diagrams of chromatic aberration (on-axis chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, M designates the meridional image, and Y designates an image height. In the tables, $F_{NO}$ designates the f-number, f designates the focal length of the entire wide-angle lens system, $f_B$ designates the back focal distance, w designates the half angle-of-view (°), r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}.$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

[Embodiment 1]

FIG. 1 is a lens arrangement of a zoom lens system according to the first embodiment of the present invention. FIGS. 2A through 2E show aberrations occurred in the lens arrangement shown in FIG. 1 at the short focal length extremity. FIGS. 3A, 3B through 3E show aberrations occurred in the lens arrangement shown in FIG. 1 at an intermediate focal length. FIGS. 4A through 4E show aberrations occurred in the lens arrangement shown in FIG. 1 at the long focal length extremity. Table 1 shows the numerical data of the first embodiment.

The zoom lens system includes a positive first lens group 10 and a negative second lens group 20, in this order from the object. Zooming is performed by moving each of the positive first lens group 10 and the negative second lens group 20 in the optical axis direction.

The positive first lens group 10 includes a positive first lens element L1 having a convex surface facing toward the object, a negative second lens element L2, and a positive third lens element L3, in this order from the object.

The negative second lens group 20 includes a fourth lens element L4 which is formed as a positive meniscus lens element having the concave surface facing toward the object, and a fifth lens element L5 which is formed as a negative meniscus lens element having the concave surface facing toward the object, in this order from the object.

A diaphragm S is provided between the positive first lens group 10 and the negative second lens group 20, and is positioned 1.00 mm from the positive first lens group 10 on the image side.

TABLE 1

Fno = 1:6.0–6.9–13.6
f = 39.33–50.00–115.80
W = 27.8–22.6–10.5
fB = 9.07–18.63–77.61

| Surface | r | d | $N_d$ | ν |
|---|---|---|---|---|
| 1 | 18.031 | 2.00 | 1.51633 | 64.1 |
| 2 | 31.848 | 1.26 | — | — |
| 3* | −63.839 | 1.30 | 1.58547 | 29.9 |
| 4 | 51.813 | 4.99 | — | — |
| 5 | −1021.339 | 2.30 | 1.60311 | 60.7 |
| 6 | −14.450 | 15.68–11.52–2.80 | — | — |
| 7* | −50.021 | 3.17 | 1.58547 | 29.9 |
| 8 | −21.350 | 3.63 | — | — |
| 9 | −11.137 | 1.20 | 1.78590 | 44.2 |
| 10 | −58.017 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 3 | $-0.10000 \times 10$ | $-0.10484 \times 10^{-3}$ | $-0.41969 \times 10^{-6}$ | — |
| 7 | $-0.10000 \times 10$ | $0.57535 \times 10^{-4}$ | $0.26388 \times 10^{-7}$ | $0.36776 \times 10^{-8}$ |

[Embodiment 2]

FIG. 5 is a lens arrangement of a zoom lens system according to the second embodiment of the present invention. FIGS. 6A through 6E show aberrations occurred in the lens arrangement shown in FIG. 5 at the short focal length extremity. FIGS. 7A through 7E show aberrations occurred in the lens arrangement shown in FIG. 5 at an intermediate focal length. FIGS. 8A through 8E show aberrations occurred in the lens arrangement shown in FIG. 5 at the long focal length extremity. Table 2 shows the numerical data of the second embodiment. The basic arrangement of the second embodiment is the same as that of the first embodiment.

TABLE 2

Fno = 1:4.2–5.4–12.5
f = 39.33–50.00–115.80
W = 27.8–22.6–10.5
fB = 8.76–18.06–75.37

| Surface | r | d | $N_d$ | ν |
|---|---|---|---|---|
| 1 | 31.877 | 2.10 | 1.65844 | 50.9 |
| 2 | 75.230 | 1.18 | — | — |
| 3* | −144.292 | 1.30 | 1.58547 | 29.9 |
| 4 | 36.873 | 5.28 | — | — |
| 5 | −115.521 | 3.00 | 1.58913 | 61.2 |
| 6 | −12.709 | 16.26–12.40–4.30 | — | — |
| 7* | −39.087 | 2.40 | 1.58547 | 29.9 |
| 8* | −24.449 | 4.20 | — | — |
| 9 | −12.460 | 1.40 | 1.77250 | 49.6 |
| 10 | −70.131 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 3 | $-0.10000 \times 10$ | $-0.12650 \times 10^{-3}$ | $-0.65388 \times 10^{-6}$ | — |
| 7 | $-0.10000 \times 10$ | $0.82365 \times 10^{-4}$ | $-0.91464 \times 10^{-7}$ | $0.21590 \times 10^{-8}$ |
| 8 | $-0.10000 \times 10$ | $0.29086 \times 10^{-4}$ | — | — |

[Embodiment 3]

FIG. 9 is a lens arrangement of a zoom lens system according to the third embodiment of the present invention. FIGS. 10A through 10E show aberrations occurred in the lens arrangement shown in FIG. 9 at the short focal length extremity. FIGS. 11A through 11E show aberrations occurred in the lens arrangement shown in FIG. 9 at an intermediate focal length. FIGS. 12A through 12E show aberrations occurred in the lens arrangement shown in FIG. 9 at the long focal length extremity. Table 3 shows the numerical data of the third embodiment. The basic arrangement of the third embodiment is the same as that of the first embodiment.

TABLE 3

Fno = 1:6.0–7.3–13.6
f = 39.33–50.00–115.80
W = 27.8–22.6–10.5
fB = 9.06–18.53–76.88

| Surface | r | d | $N_d$ | ν |
|---|---|---|---|---|
| 1 | 16.325 | 2.00 | 1.51633 | 64.1 |
| 2 | 27.557 | 1.32 | — | — |
| 3* | −63.360 | 1.30 | 1.58547 | 29.9 |
| 4 | 49.338 | 4.61 | — | — |
| 5 | −1594.458 | 2.30 | 1.58913 | 61.2 |
| 6 | −14.006 | 15.33–11.28–2.80 | — | — |
| 7* | −37.387 | 2.40 | 1.58547 | 29.9 |
| 8 | −20.319 | 4.01 | — | — |
| 9 | −10.264 | 1.20 | 1.67003 | 47.3 |
| 10 | −64.059 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 3 | $-0.10000 \times 10$ | $-0.11299 \times 10^{-3}$ | $-0.49433 \times 10^{-6}$ | — |
| 7 | $-0.10000 \times 10$ | $0.63218 \times 10^{-4}$ | $0.67190 \times 10^{-7}$ | $0.52279 \times 10^{-8}$ |

The numerical values of each condition for each embodiment are shown in Table 4.

TABLE 4

| | Embod. 1 | Embod. 2 | Embod. 3 |
|---|---|---|---|
| Condition (1) | 1.509 | 1.405 | 1.583 |
| Condition (2) | 3.959 | 4.049 | 3.993 |
| Condition (3) | 3.61 | 2.471 | 3.907 |
| Condition (4) | L1: 1.51633 | 1.65844 | 1.51633 |
| | L3: 1.60311 | 1.58913 | 1.58913 |
| Condition (6) | 0.481 | 0.472 | 0.477 |
| Condition (7) | −1.729 | −2.273 | −1.800 |
| | (h = 4.94) | (h = 5.00) | (h = 4.88) |

| Condition (5) | | | |
|---|---|---|---|
| Embodiment 1 | L1:49.6 < 64.1 < 88.9 | | |
| | L3:42.5 < 60.7 < 67.2 | | |
| Embodiment 2 | L1:38.0 < 50.9 < 53.4 | | |
| | L3:43.7 < 61.2 < 70.7 | | |
| Embodiment 3 | L1:49.64 < 64.1 < 88.9 | | |
| | L3:43.7 < 61.2 < 70.7 | | |

As can be understood from Table 4, each of the first through third embodiments satisfy conditions (1) through (7), and as can be understood from the aberration diagrams, the various aberrations are adequately corrected.

According to the zoom lens system of the present invention, the light-weight and two-lens-group zoom lens system with the zoom ratio of more than 3.1, which can be constituted by a smaller number of lens elements, can be obtained. Furthermore, the lens elements can be made from an inexpensive lens material. Accordingly, the production costs can be reduced.

The above advantages can be obtained due to the following arrangement of the zoom lens system:

1) The zoom lens system includes a positive first lens group and a negative second lens group, in this order from the object;

2) The positive first lens group includes a positive first lens element having a convex surface facing toward the object, a negative second lens element, and a positive third lens element, in this order from the object.

3) The negative second lens group includes a fourth lens element which is formed as a positive meniscus lens element having the concave surface facing toward the object, and a fifth lens element which is formed as a negative meniscus lens element having the concave surface facing toward the object, in this order from the object.

What is claimed is:

1. A zoom lens system consisting of five lens elements which are divided into a positive first lens group and a negative second lens group, in this order from an object, wherein zooming is performed by moving each of said positive first lens group and said negative second lens group in an optical axis direction;

wherein said positive first lens group consists of a positive first lens element having a convex surface facing toward said object, a negative second lens element, and a positive third lens element, in this order from said object;

wherein said negative second lens group consists of a fourth lens element which is formed as a positive meniscus lens element having the concave surface facing toward said object, and a fifth lens element which is formed as a negative meniscus lens element having the concave surface facing toward said object, in this order from said object; and wherein said zoom lens system satisfies following conditions:

$$1.2 < ft/f1 > 1.8$$

$$3.8 < ft/f1G < 4.2$$

$$1 \leq SF1 < 6$$

wherein ft designates the focal length of the entire zoom lens system at the long focal length extremity;

f1 designates the focal length of said positive first lens element;

f1G designates the focal length of said positive first lens group, and

SF1 designates the shape factor of said positive first lens element, defined as SF1=(r2+r1)/(r2−r1);

r1 designates the radius of curvature of the first surface of said positive first lens element; and r2 designates the radius of curvature of the second surface of said positive first lens element.

2. The zoom lens system according to claim 1, wherein said positive first lens group further satisfies the following conditions:

$$1.50 < n1p < 1.68$$

$$-81.2 \times n1p + 172.7 < v1p < -250 \times n1p + 468$$

wherein n1p designates the refractive index of said positive lens elements in said positive first lens group; and v1p designates the Abbe number of said positive lens elements in said positive first lens group.

3. The zoom lens system according to claim 1, further satisfying the following condition:

$$0.45 < \Delta X/ft < 0.50$$

wherein

ΔX designates the traveling distance of said positive first lens group upon zooming from the short focal length extremity to the long focal length extremity.

4. The zoom lens system according to claim 1, further satisfying the following condition:

$$-3.0 < \Delta ASP2 \times 1000/fs < -1.0$$

wherein

ΔASP2 designates the amount of asphericity on the object-side surface of said negative second lens element;

fs designates the focal length of the entire zoom lens at the short focal length extremity.

5. A zoom lens system comprising a positive first lens group and a negative second lens group, in this order from an object, wherein zooming is performed by moving each of said positive first lens group and said negative second lens group in an optical axis direction;

wherein said positive first lens group comprises a positive first lens element having a convex surface facing toward said object, a negative second lens element, and a positive third lens element, in this order from said object;

wherein said negative second lens group comprises a fourth lens element which is formed as a positive meniscus lens element having the concave surface facing toward said object, and a fifth lens element which is formed as a negative meniscus lens element having the concave surface facing toward said object, in this order from said object; and wherein said zoom lens system satisfies following conditions:

$$1.2 < ft/f1 < 1.8$$

$$3.8 < ft/f1G < 4.2$$

$$1 < SF1 < 6$$

$$0.45 < \Delta X/ft < 0.50$$

wherein ft designates the focal length of the entire zoom lens system at the long focal length extremity;

f1 designates the focal length of said positive first lens element;

f1G designates the focal length of said positive first lens group, and

SF1 designates the shape factor of said positive first lens element, defined as SF1=(r2+r1)/(r2−r1);

r1 designates the radius of curvature of the first surface of said positive first lens element;

r2 designates the radius of curvature of the second surface of said positive first lens element; and ΔX designates the traveling distance of said positive first lens group upon zooming from the short focal length extremity to the long focal length extremity.

* * * * *